(No Model.)
W. J. GRAHAM.
CLOSING DEVICE FOR CANS OR JARS.
No. 488,999. Patented Jan. 3, 1893.
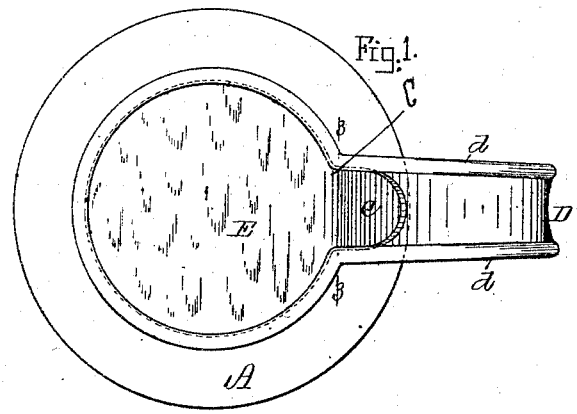
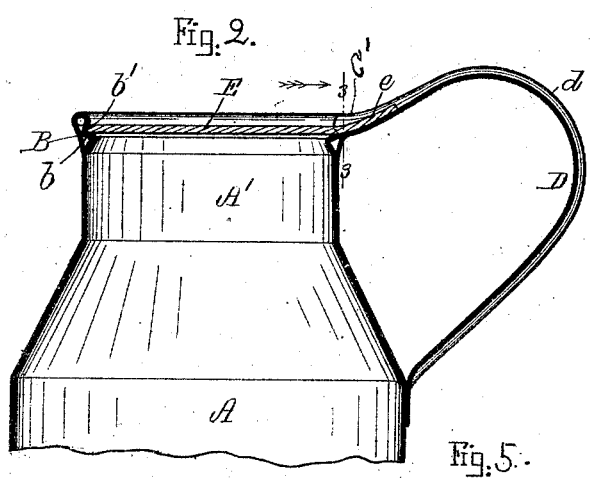
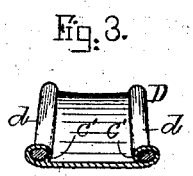
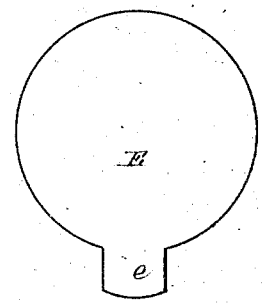
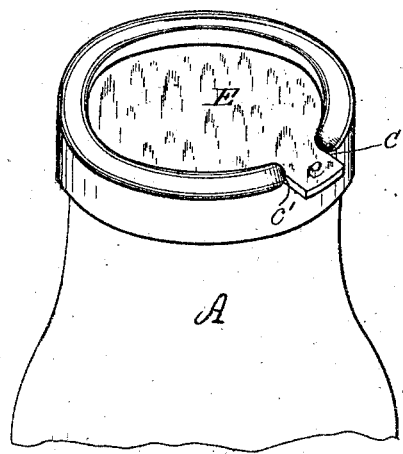
Witnesses.
Laurity N. Möller
Alice A. Perkins
Inventor
William J. Graham
by
Alban Andrén
his atty.

UNITED STATES PATENT OFFICE.

WILLIAM J. GRAHAM, OF WALTHAM, MASSACHUSETTS.

CLOSING DEVICE FOR CANS OR JARS.

SPECIFICATION forming part of Letters Patent No. 488,999, dated January 3, 1893.

Application filed November 4, 1892. Serial No. 451,006. (No model.)

*To all whom it may concern:*

Be it known that I, WILLIAM J. GRAHAM, a citizen of the United States, and a resident of Waltham, in the county of Middlesex and State of Massachusetts, have invented new and useful Improvements in Closing Devices for Cans and Jars, of which the following, taken in connection with the accompanying drawings, is a specification.

This invention relates to improvements in closing devices for cans and jars and it is especially well adapted for milk cans although it is equally useful for other purposes as will hereinafter be more fully shown and described reference being had to the accompanying drawings—wherein—

Figure 1 represents a plan view of a can provided with my improved closing device; and Fig. 2 represents a central longitudinal section of the same; Fig. 3 represents a cross section on the line 3—3 shown in Fig. 1; Fig. 4 represents a detail plan view of the closing disk; and Fig. 5 represents a perspective view of a glass jar provided with my improved closing device.

Similar letters refer to similar parts wherever they occur on the different parts of the drawings.

The invention is equally applicable to cans having a handle shown in Figs. 1, 2 and 3, as well as to handleless jars shown in Fig. 5.

In the drawings A represents a can or jar on which A' is the neck. The neck has on its interior an annular groove B having preferably a slightly inclined base b and above the latter a slightly undercut or beveled annular lip b' as shown. The annular lip b' has at one place on its circumference a cut-away portion C the sides of which are also made slightly under cut or beveled as shown at C', C', in Figs. 3 and 5.

D in Figs. 1 and 2 represents the handle of the can which is preferably arranged opposite to the cut-away portion C as shown in Fig. 1.

In connection with a can or jar having an internal annular groove and a cut-away portion thereon as described, I use a closing device shown in detail in Fig. 4; it consists of a flexible disk E preferably made of paper, paste board, pulp or leather board or it may be made of other suitable material, such disk having at one portion of its circumference a radial projection or picker piece e as shown.

When it is desired to close the mouth of the can or jar, the disk E is pressed into the groove B and the projection e on said disk is pressed into the cut-away portion C as shown in the drawings. The said projection e is preferably made sufficiently long to extend slightly outside of the neck of the jar so as to permit its being grasped by fingers in removing the closing disk from the neck of the jar or can. This is a great advantage over closing devices in which the grooved neck of the can or jar is continuous and adapted to receive a circular closing disk, which device requires a tool of some kind for instance a fork, knife, &c. for the purpose of detaching the closing disk from the groove in the neck of the can or jar which is liable to injure or break said closing disk thus rendering it useless in opening the can or jar.

By making a cut-away portion in the grooved neck of the can or jar and by making the closing disk with a radial projection or picker piece, the latter can be removed whenever so desired without the need of any tools or implements liable to injure, deface or destroy said disk, which therefore may be used over and over a great number of times.

When the device is used on a can having a handle as shown in Figs. 1, 2 and 3, the picker piece e is placed on top of said handle between its ribs d, d, as shown in Fig. 1 thus protecting said picker piece and preventing its being accidentally removed in handling the can.

Having thus fully described the nature, construction and operation of my invention, I wish to secure by Letters Patent and claim:

A can or jar having at the upper portion of its neck an internal groove and a cut-away portion of the said grooved neck combined with a flexible closing disk, adapted to be retained in said groove and having a radial projection or picker piece adapted to be retained in said cut-away portion, and to serve as a means for readily removing said disk, substantially as and for the purpose set forth.

In testimony whereof I have signed my name to this specification, in the presence of two subscribing witnesses, on this 8th day of October, A. D. 1892.

WILLIAM J. GRAHAM.

Witnesses:
ALBAN ANDRÉN,
THORSTEN VON ZWEIGBURGH.